US007896643B2

(12) United States Patent
Serener-Thielmann

(10) Patent No.: US 7,896,643 B2
(45) Date of Patent: Mar. 1, 2011

(54) VENTING DEVICE FOR MOLD

(75) Inventor: Tayfun Serener-Thielmann, Wiesbaden (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 165 days.

(21) Appl. No.: 12/334,861

(22) Filed: Dec. 15, 2008

(65) Prior Publication Data

US 2010/0148031 A1 Jun. 17, 2010

(51) Int. Cl.
*B29C 33/10* (2006.01)
(52) U.S. Cl. .................. 425/470; 249/141; 425/472; 425/812
(58) Field of Classification Search ............. 425/28.1, 425/470, 472, 812; 249/141
See application file for complete search history.

(56) References Cited

U.S. PATENT DOCUMENTS

| | | | | |
|---|---|---|---|---|
| 3,374,983 | A | 3/1968 | Garretson et al. ........... 249/205 |
| 3,989,430 | A | 11/1976 | Dailey ................... 425/28 R |
| 4,026,512 | A * | 5/1977 | Holt ...................... 425/812 |
| 4,081,225 | A * | 3/1978 | Yaita .................... 249/141 |
| 4,795,331 | A * | 1/1989 | Cain et al. ................ 425/812 |
| 6,561,779 | B2 | 5/2003 | Nitsch et al. ............. 425/28.1 |
| 6,808,376 | B2 | 10/2004 | Serener-Thielmann ..... 425/28.1 |
| 6,817,848 | B2 * | 11/2004 | Ishihara .................. 425/812 |
| 7,125,511 | B2 | 10/2006 | Serener-Thielmann ...... 264/326 |
| 7,530,803 | B2 * | 5/2009 | Seroka ................... 425/812 |

FOREIGN PATENT DOCUMENTS

| | | |
|---|---|---|
| EP | 0 311 550 A2 | 4/1989 |
| EP | 1 213 131 A1 | 6/2002 |
| EP | 1 375 105 A2 | 1/2004 |
| EP | 1 518 653 A2 | 3/2005 |
| JP | 2005028589 | 2/2005 |
| WO | 00/06358 | 2/2000 |
| WO | 2008/136904 A1 | 11/2008 |

OTHER PUBLICATIONS

European Search Report Feb. 17, 2010.

* cited by examiner

*Primary Examiner*—James Mackey
(74) *Attorney, Agent, or Firm*—June E. Rickey

(57) ABSTRACT

A mold and mold blocking member is provided for use in a vent bore of a mold for the manufacture of rubber products. The mold blocking member has a tubular hollow body having a first end and a second end, wherein the first end has a cap having an outer dimension greater than the diameter of the tubular body, wherein the cap has at least one undercut forming an opening, wherein the opening is positioned to be adjacent the mold surface.

8 Claims, 5 Drawing Sheets

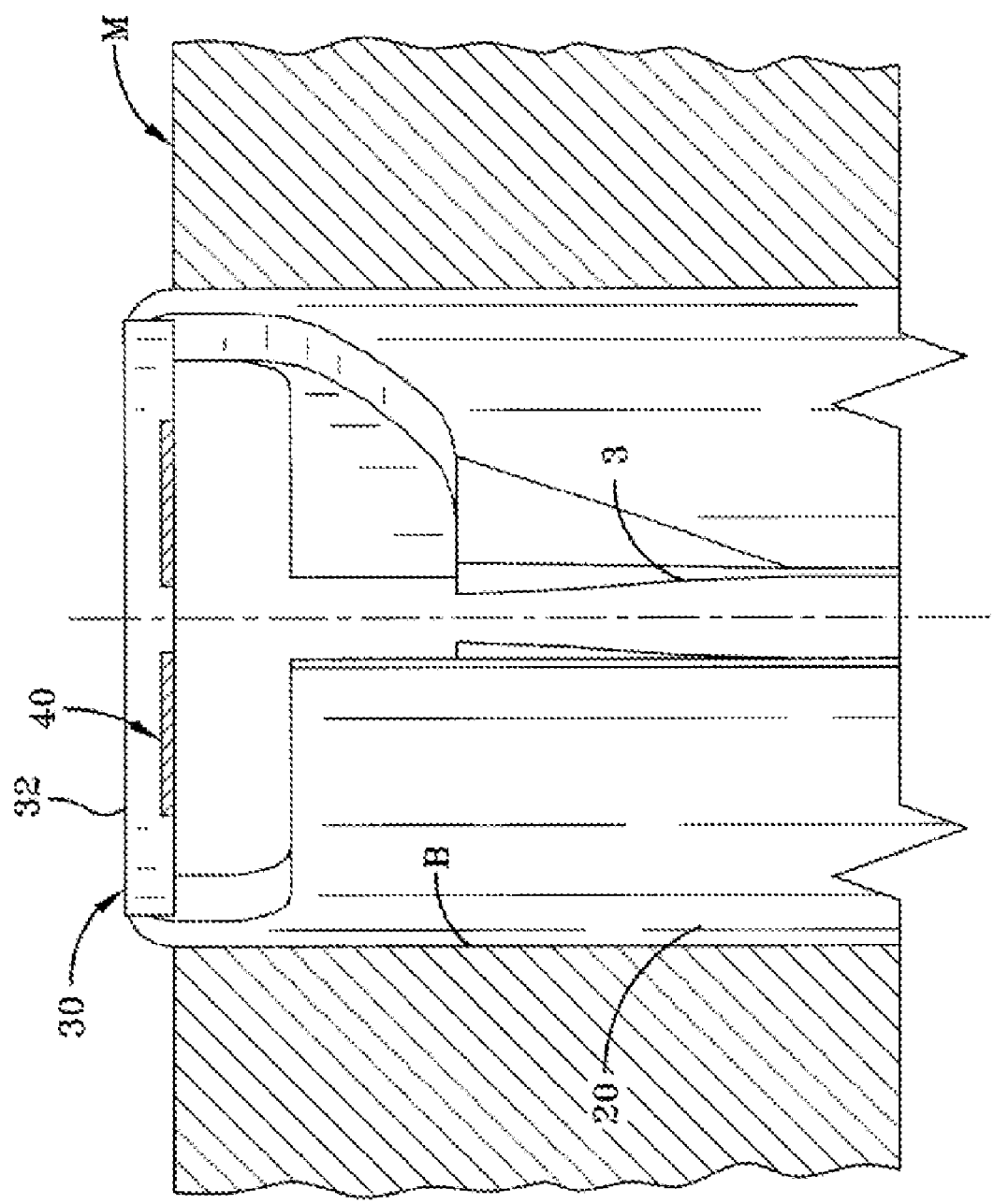

VENTING DEVICE FOR MOLD

FIELD OF THE INVENTION

The invention relates to a blocking member for vent bores in molds for the manufacture of rubber products such as tires. More particularly, the invention is directed to a mold which is equipped with one or more such blocking members.

BACKGROUND OF THE INVENTION

There are generally two types of molds used in the production of rubber articles, such as tires. The first type is the ventless type wherein the mold gasses are vented through cracks in the mold surfaces. The second type of mold is the vented type which comprises a plurality of venting bores in which pins or other devices are inserted to block the flow of rubber while venting the mold. The blocking devices allow the air and mold gasses to vent while preventing the flow of rubber. Without the blocking devices, tiny spues or rubber shoots form on the surface of the article resulting in a hedge hog appearance. Prior art blocking devices may stop the formation of these rubber shoots, but may result in marks on the surface of the tire. Thus it is desired to have an improved blocking device which allows the gasses to be vented without the formation of rubber shoots and without marks being formed on the tires.

SUMMARY OF THE INVENTION

The invention provides in a first aspect a mold blocking member for use in a vent bore of a mold for the manufacture of rubber products, the mold blocking member comprising: a tubular hollow body having a first end and a second end, wherein the first end has a cap having an outer dimension greater than the diameter of the tubular body, wherein the cap has at least one undercut forming a opening, wherein the opening is positioned to be adjacent the mold surface.

The invention provides in a second aspect a mold blocking member for use in a vent bore of a mold for the manufacture of rubber products, the mold blocking member comprising: a tubular hollow body having a first end and a second end, wherein the first end has a cap having an outer dimension greater than the diameter of the tubular body, wherein the cap has at least one undercut forming a opening, wherein the opening is positioned to be adjacent the mold surface.

BRIEF DESCRIPTION OF THE DRAWINGS

The invention will be described by way of example and with reference to the accompanying drawings in which:

FIG. 7 is a cross sectional view of the blocking device inserted in a mold bore.

DETAILED DESCRIPTION OF THE INVENTION

Figure 1:
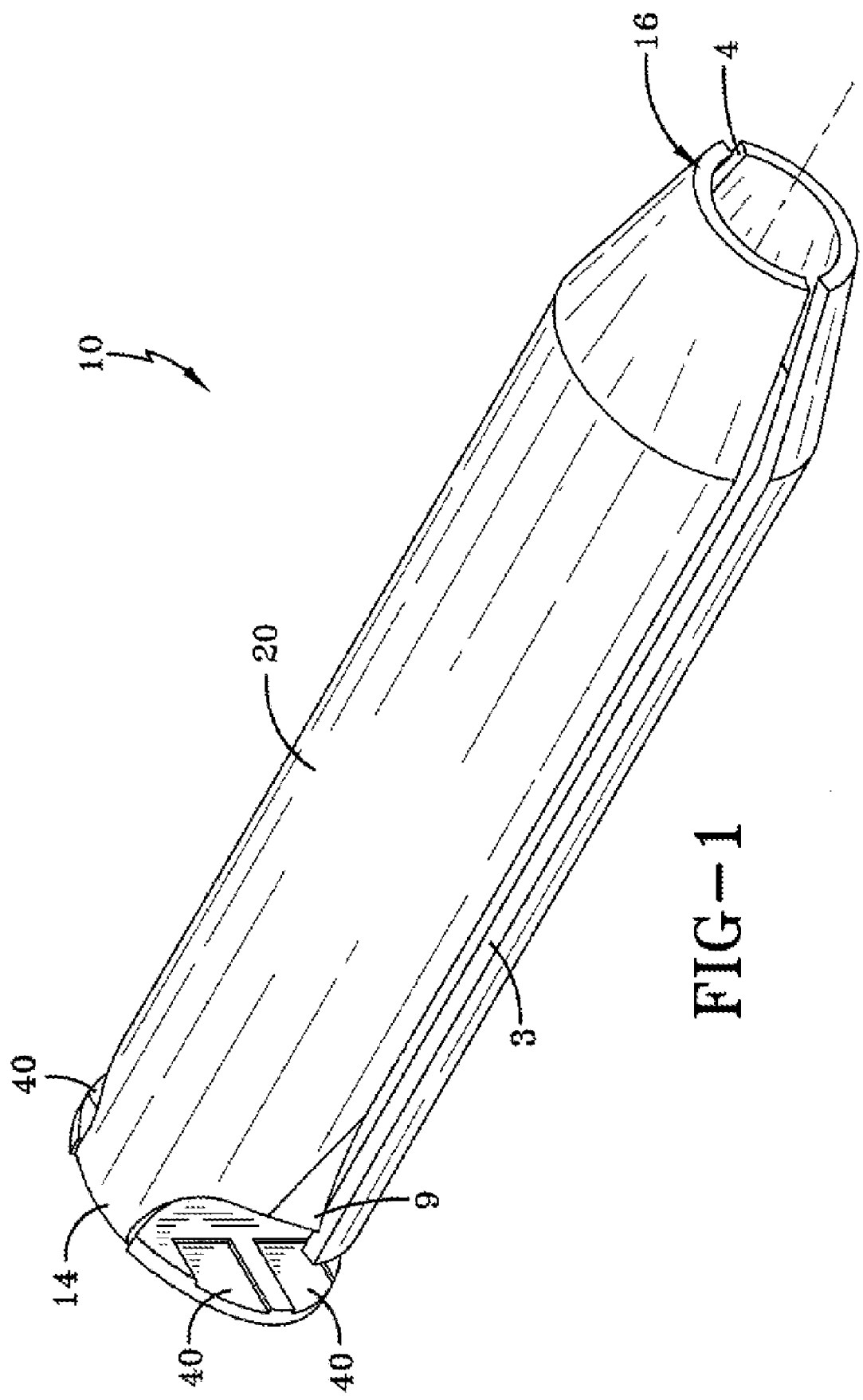
FIG. 1 is a perspective view of a blocking device.

FIG. 1 illustrates a blocking member 10 of the present invention. The blocking member 10 comprises a hollow, longitudinal body 20 having a first end 12 with a cap 30 connected thereto via lugs 14. The central body 20 is preferably tapered from a first end 12 to a second end 16. The central body 20 further comprises optional barbs 9 which extend like fins from the hollow body and function to secure the blocking device in the vent bores to prevent pullout during demolding.

Figure 2:
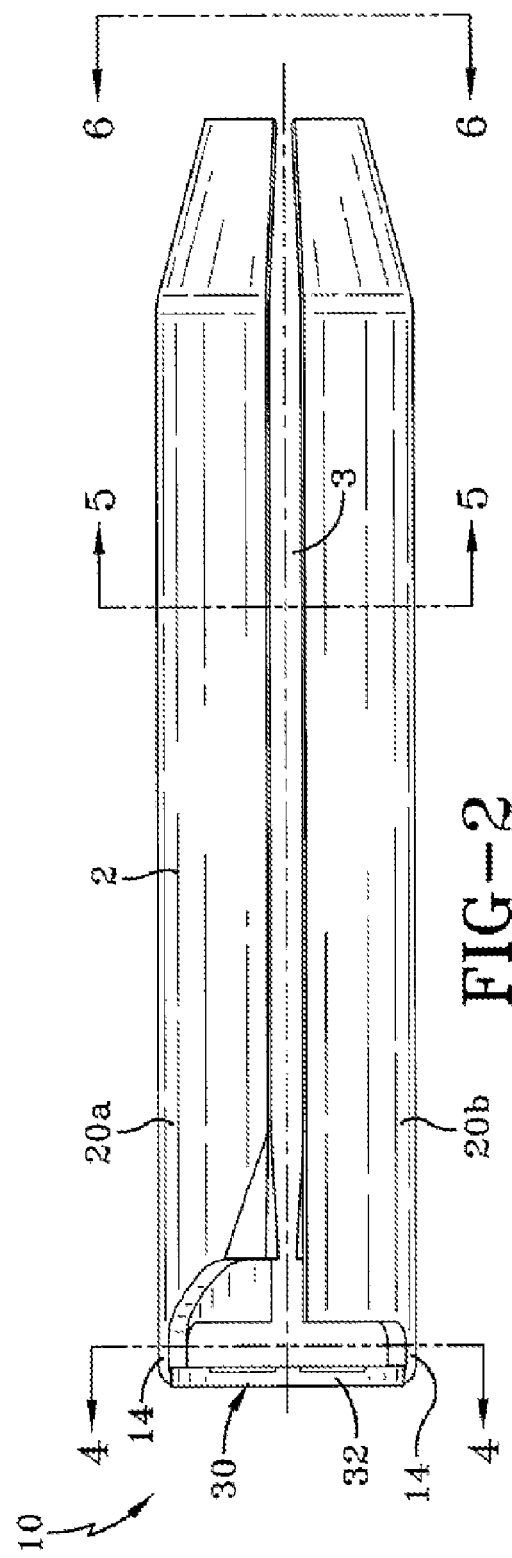
FIG. 2 is a side view of the blocking device of FIG. 1.
Figure 3:
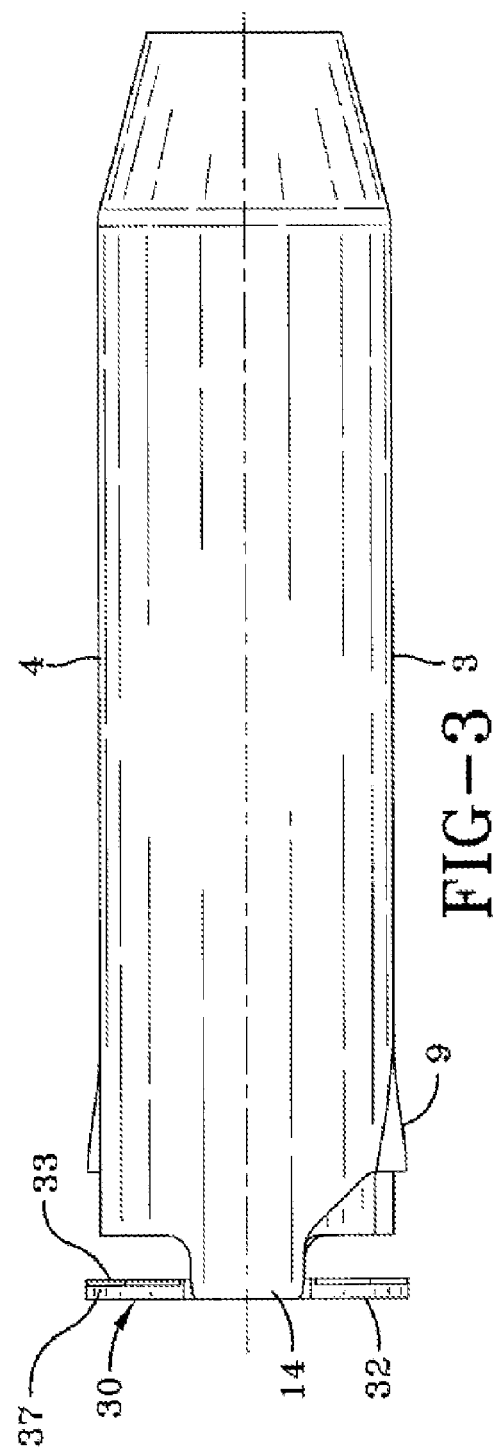
FIG. 3 is a top view of the blocking device of FIG. 1.
Figure 6:
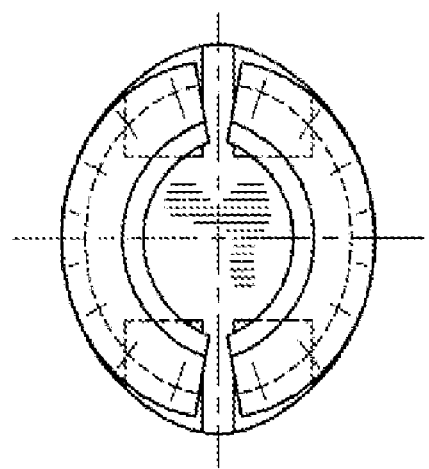
FIG. 6 is an end view of the blocking device in the direction 6-6 of FIG. 1.
Figure 5:
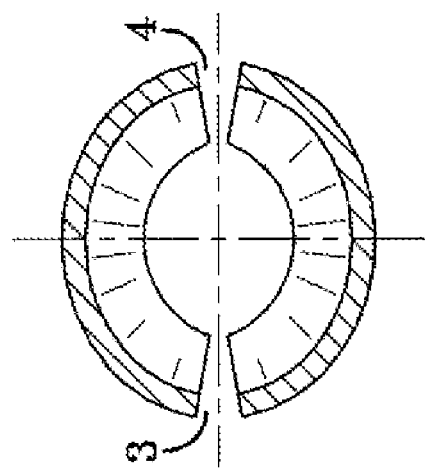
FIG. 5 is a cross-sectional view in the direction 5-5 of FIG. 1.

As shown in FIGS. 2 and 3, the central body 20 may be formed of two halves 20a, 20b which are divided by longitudinal openings 3, 4. The openings provide the central body free mobility in the radial direction during insertion of the device into the vent bore. The openings close as the blocking device is inserted into the mold vent bores.

The blocking member 10 is preferably formed from a thin sheet of metal stock, and may be formed from stamping or punching the metal and then bending the metal into the desired profile. The outer diameter of the blocking members may be any desired size, but typically range from about 2 to about 5 mm.

Figure 4:
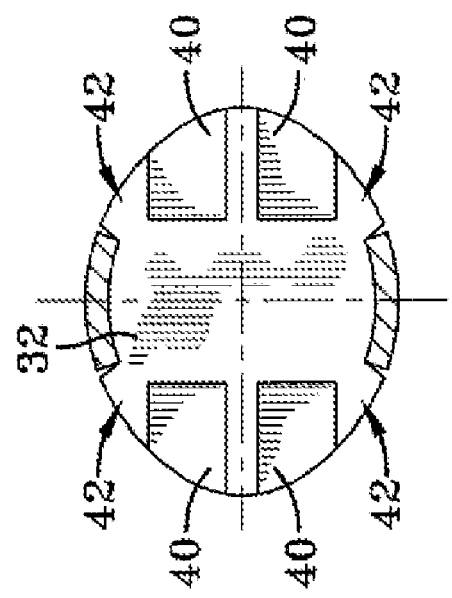
FIG. 4 is an end view of the blocking device in the direction 4-4 of FIG. 1.

The cap 30 is preferably formed by a thin plate the peripheral contour of which is oval or non-round. The outer surface of plate 32 is preferably flat, while the inner surface 33 of plate 32 has a plurality of openings such as channels 40, shown in FIG. 4. The channels or openings 40 may be rectangular in shape and have a channel depth in the range of about 0.03 mm to about 0.07 mm, or 25% to 50% of the plate thickness. The plate thickness is preferably about 0.07 to about 0.20 mm thick, more preferably about 0.15 mm thick. The outer surface of plate 32 has no slit openings. Notches 42 allow the lugs 14 to be bent 90 degrees.

Figure 8:
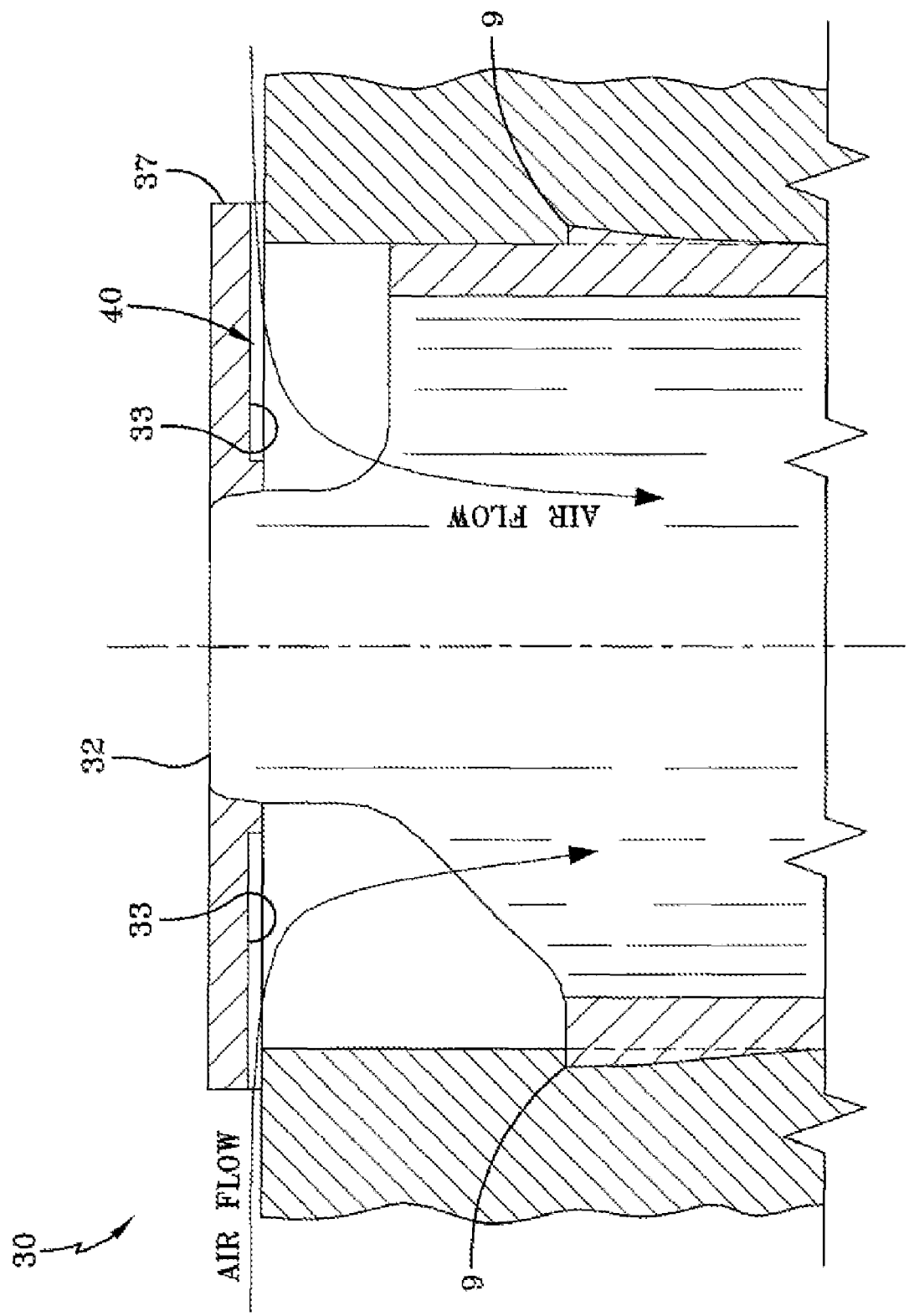
FIG. 8 is illustrates the air pathway of the blocking device of FIG. 7.

FIG. 7 illustrates a side view of the blocking device 10 inserted into a mold bore B, wherein the cap 30 is not flush with the outer mold surface M. The outer surface 32 of the cap 30 slightly protrudes above the inner surface M of the mold so that the channels 40 are open to vent any trapped mold gasses. The oval or non-round shape of the outer cap prevents the blocking device from being inserted too deep within the bores of the mold. As shown in FIG. 8, the trapped mold gasses must travel 90 degrees down the side 37 of the cap 30 and then bend another 90 degrees into channels 40. The double bend of the flow path acts as a labyrinth in order to block the rubber from flowing past the cap.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold for the manufacture of rubber products, the mold comprising an outer surface, a vent bore and a mold blocking member positioned within the vent bore, the mold blocking member having a tubular hollow body having a first end and a second end, wherein the first end has a cap having an outer dimension greater than the diameter of the tubular body, wherein the cap has an outer surface and an inner surface having at least one undercut forming an opening, wherein the cap inner surface and the cap undercut protrude from the outer surface of the mold, wherein the opening is positioned adjacent the mold outer surface, and wherein the mold blocking member is made of metal.

2. The mold of claim 1 wherein the opening has a minimum dimension in the range of about 0.03 mm to about 0.07 mm.

3. The mold of claim 1 wherein the cap outer surface is not flush with the mold surface.

4. The mold of claim 1 wherein the openings are channels with rectangular cross-sections.

5. The mold of claim 1 wherein the diameter of the body ranges from about 2 to about 5 mm.

6. The mold of claim 1 wherein the outer surface of the cap has no holes.

7. The mold of claim 1 wherein the outer surface of the cap is solid.

8. The mold of claim 1 wherein the cap has a non-circular cross-sectional shape.

* * * * *